United States Patent [19]

Tohyama et al.

[11] 4,145,371
[45] Mar. 20, 1979

[54] FLAME-RETARDANT FIBER HAVING AN EXCELLENT COLOR-FASTNESS AND PREPARATIVE METHOD THEREOF

[75] Inventors: Shunroku Tohyama; Yutaka Masuda; Tatsuo Nogi, all of Otsu, Japan

[73] Assignee: Toray Industries, Inc., Tokyo, Japan

[21] Appl. No.: 800,000

[22] Filed: May 24, 1977

[30] Foreign Application Priority Data

Oct. 1, 1976 [JP] Japan ................................. 51-117261

[51] Int. Cl.$^2$ ...................... C08L 29/04; C08L 61/34; C08L 61/24; C08G 12/38
[52] U.S. Cl. ..................................... 260/856; 260/851; 264/176 F
[58] Field of Search .............................. 260/851, 856; 264/176 F

[56] References Cited

U.S. PATENT DOCUMENTS 2,376,511   5/1945   Saunders ............................... 260/856

FOREIGN PATENT DOCUMENTS 2364091   7/1976   Fed. Rep. of Germany ........... 260/856
1452629  10/1976   United Kingdom ..................... 260/856

*Primary Examiner*—John C. Bleutge
*Attorney, Agent, or Firm*—Miller & Prestia

[57] ABSTRACT

Disclosed is a highly flame-retardant fiber of excellent color-fastness which is made from the mixture composition of 30 to 60 parts of an amino resin composed of a condensation product of formaldehyde with melamine and other amino compounds selected from, urea, dicyandiamide and benzoguanamine, and 70 to 40 parts of polyvinyl alcohol. The incorporation of 0.1 to 4.0% by weight of phosphorus by the addition of a reactive organic phosphorous compound to the spinning dope or to the wet filaments before drawing causes noticeable enhancement of the flame-retardance. Curing and cross-linking may be carried out during the yarn-making process of spinning, drawing and heat-setting or after the yarn-making process by treatment in an acidic formaldehyde environment.

3 Claims, No Drawings

FLAME-RETARDANT FIBER HAVING AN EXCELLENT COLOR-FASTNESS AND PREPARATIVE METHOD THEREOF

BRIEF SUMMARY OF THE INVENTION

The great demand for non-combustible or flame-retardant textiles caused by combustible textiles hazards to and loss of human life in fires has lead us to this invention.

The present invention is based on technical progress over our previous invention of U.S. Pat. application Ser. No. 575,590 now abandoned. This invention relates to a highly flame-retardant synthetic fiber of excellent colour-fastness consisting mainly of polyvinyl-alcohol and an amino resin composed of a condensation product of formaldehyde with melamine and other amino compounds selected from urea, dicyandiamide and benzoguanamine, and relates to the preparative processes for making the same. In order to further enhance the flame-retardant characteristics of a fiber 0.1 to 4.0%, phosphorus is incorporated into the fiber composition by adding organic phosphorous compounds reactive with the amino resin preferably, to the spinning dope. As another method of incorporating phophorus into the fiber, the wet filaments take up a reactive organic phosphorous compound from an aqueous or organic solvent solution during the yarn-making process before drawing and heat-treatment.

The flame-retardant character is multiply enhanced by phosphorus and the effect is surprising and definite. Further, good dyeability and excellent colour-fastness are caused by the incorporation of dicyandiamide as one component of the amino compounds for preparing the amino resin.

A novel and more simplified process for curing and crosslinking, which favours the mechanical characteristics and dimensional stability of the fiber under hot-wet conditions, has been invented. This novel process comprises dipping the wet filaments for several seconds into a solution of a proper crosslinking accelerator during the yarn-making process before drawing. Heat imparted to the fiber during the drawing and heat-treatment process causes the crosslinking and curing reactions of the amino resin and polyvinyl alcohol due to the function of the crosslinking accelerator, such as methyrol melamine, tetrakis(hydroxymethyl)phosphonium salts and ammonium chloride. The fiber of the invention has a very wide variety of end-uses because of its various characteristics such as unflamability, good dyeability, excellent colour-fastness, good resistance to acid and alkalies, and moderate hydroscopic character of 8 to 10%, at 65% relative humidity, similar to the natural fibers. Other advantages and details of the invention will become more apparent in the following description and examples.

DETAILED DESCRIPTION OF THE INVENTION

This invention relates to highly flame-retardant fibers of excellent colour-fastness consisting mainly of an amino resin and polyvinyl alcohol components. The recent increase of human injuries from fires due to undesirable combustion of textiles, have caused a great demand for flame-retardant textiles and materials thereof. Strict regulations on the fire-extinguishing of flame-retardant textiles have been enacted in many countries. In view of this, we have already proposed fire-retardant fibers and the preparative method thereof. However, these fibers of our previous invention are not of completely satisfactory practical use for textile materials. One of the defects to be corrected is the low colour-fastness, and we have put a great deal of effort into correcting this defect for years.

We have at last reached this invention which provides highly fire-retardant fibers having a high colour-fastness consisting mainly of 30 to 60 parts of amino resins made from amino compounds of melamine and other amino-compounds selected from urea dicyandiamide and benzoguanamine, and 70 to 40 parts of polyvinyl alcohol or partially formylated polyvinyl alcohol. Especially when the amino compounds in the amino resin are the mixtures of melamine, urea and dicyandiamide, the fibers from the compounds and polyvinyl alcohol have a much greater colour-fastness to acid dyes than any other proposed fibers obtained from the admixture of polyvinyl alcohol and the amino resins not containing dicyandiamide as one component. Though the main components of this invention are amino resins and polyvinyl alcohol or partially formylated polyvinyl alcohol, as mentioned above, other minor components may be added in order to give a supplementary character to the fiber inside the range in which the fundamental characteristics may not be greatly damaged. Polyvinyl compounds, for example, polyacrylamide, poly(N-methylol)acrylamide, polyacrylonitrile and polyvinylacetate, inorganic compounds, for example, titanium oxide, antimony oxide, stannic chloride, stannous chloride, aluminum chloride and aluminum hydrooxide, pigments and dyestuffs, are examples of the other additives. Further, organic phosphorous compounds are a very important additives in order to give an additional flame-retardancy and they are frequently and preferably used in this invention.

The additives may be incorporated into the fiber of the invention so that they are either chemically bonded or not chemically bonded to the main components of amino resin or polyvinyl alcohol. The amino and polyvinyl alcohol or partially formylated polyvinyl alcohol, can be partially chemically bonded to each other or can exist as independent components. The use of the mixture of melamine, urea and dicyandiamide as main amino components is the characteristic feature of this invention.

In existing literature we have not found an example of obtaining a fiber from the mixture of amino resin containing dicyandiamide as one component and polyvinyl alcohol. In fact, the surprisingly great effect of the addition of dicyandiamide on the colour-fastness of the fiber has never been expected by those engaged in work in the field.

The appropriate amount of dicyandiamide which is added, is 0.5 to 50% in mole of all the amino compounds in the amino resin, and the most appropriate amount of dicyandiamide is 2 to 20 mole %. When the content of the dicyandiamide is lower than 0.5 mole %, a noticeable effect on the colour-fastness cannot be obtained. The amount of more than 50 mole %, on the other hand, leads to a lack of enough stability of the amino resin solution to be spun into fibers.

The proper relative mole ratio of melamine to urea is represented by the equation, $$0.30 \leq \frac{M}{M + U} \leq 0.85,$$

and more, preferably, by the equation, $$0.40 \leq \frac{M}{M + U} \leq 0.80,$$

where M and U denote moles of melamine and urea, respectively. Outside the above mentioned range, a dope solution stable enough to be smoothly spun into fibers cannot be obtained.

Other amino compounds than melamine; urea and dicyandiamide, are allowed as minor additive amino compounds, such as guanamine compounds, such as, benzoguanamine and acetoguanamine and guanidine compounds.

The amino resin used in this invention is prepared in water and/or organic solvent, for example, dimethylsulfoxide and dimethylformamide, through controlling two reaction stages such as N-methylolation of amino compounds with formaldehyde and methylation of the N-methylol groups.

The amino resins used in this invention as one component of the spinning dope, obtained in the form of a solution or a suspension in water and or organic solvent, have a greater methylene content and a lower N-methylol content than ordinary amino resins. When these amino resins of low methylol content are mixed with polyvinyl-alcohol in solvents, the viscosity of the solution remains remarkably stable because of the few chances of the intermolecular reaction of amino resin and polyvinyl-alcohol. Actually the proportion in number of the methylene groups to the sum of the N-methylol groups and the methylene groups is at least 50%, preferably, more than 70%. That is, more than 50 mole %, preferably, more than 70 mole %, of the formaldehyde used should be reacted to be the methylene groups through the stage of N-methylol groups. The control of the content of the N-methylol and methylene groups is carried out by the adjustment of reaction conditions of the temperature, the time of reaction, the pH of the system and the mole ratio of formaldehyde to amino compounds.

The amounts of N-methylol groups and the unreacted formaldehyde can be quantitatively analyzed as the reaction proceeds by conventional, analytical methods, such as the iodmetry method and ammonium chloride method, respectively. The details of the analyses are reviewed for example in the following literature:

M. Imoto, "Formaldehyde, Its Chemistry and Technology", Asakura Shoten, Japan, 1965.

The appropriate mole ratio of formaldehyde to amino compounds is in a range from 1:0.6 to 1:1.5 in order to obtain a dope stable enough to be smoothly spun into fibers. When water which has low solubility of reactants and products, is applied as a solvent for the preparation of an amino resin, about 0.1 to 2.0 moles of an acid per mole of the amino compound should be added in order to promote the reaction and to increase the solubility of the products. Especially, it is preferable to use hydrochloric acid.

As precisely described later, the chemical structure of the amino resin produced, at the stage of the condensation reaction in solution does not remain in the fiber, but it changes ultmately into a more crosslinked structure of high methylene linkage content. Therefore, amino resin component in the fiber is insoluble and unfusible.

The deliberate control of the amount of the N-methylol and methylene groups in the stage of the preparation of precondensate of the amino resin is only to facilitate the fiber formation from the dope consisting of the amino resin and polyvinyl alcohol.

Polyvinyl alcohol or partially formylated polyvinyl alcohol is responsible mainly for the mechanical tensile characteristics of the fiber of this invention. In the state of the final product, that is, the fiber, it may exist partly as a formylated structure or partly closslinked with the amino resin component. This is frequently preferable from the viewpoint of dimensional stability in wet or hot-wet conditions. But in the state of the solution before spinning, it is preferable that the polyvinyl alcohol exists in the form of a highly saponified polyvinyl alcohol of high hydroxy group content.

In some cases polyvinyl alcohol of a relatively low degree of saponification is preferably used as one part of the polyvinyl-alcohol component. A small portion of polyvinyl-alcohol sometimes causes the formation of a very micro homogeneous spinning dope solution. It may most conveniently be incorporated at the step of the amino resin preparation or any other step of the dope preparation. Generally, polyvinyl alcohol of the degree of saponification of at least 78% is preferably used in the invention.

Polyvinyl alcohol in which a small part of the hydroxy groups are formylated, acetylated or tolylated, can be used in this invention. Partially hydrolized polyvinyl alcohol or polyvinyl-alcohol with which a small amount of another vinyl monomer is copolymerized or graft-copolymerized can also be employed in this invention. After shaping into fiber, the appropriate parts of the polyvinyl alcohol component are preferably changed to its formaldehyde by the same manner as used in the preparation of polyvinyl alcohol fibers, that is "Vinylon" fibers.

The amount ratio of amino resin and polyvinyl alcohol components can be varied from the balance of the intended fiber characteristics (nonflamability and tensile character) and the spinnability of the dope. A large amount of polyvinyl alcohol can be incorporated when organic phosphorous compounds are added because of the remarkable flame-retardant effect which reduces the amount of the amino resin component needed.

The preferable weight ratio of the amino resin to the polyvinyl alcohol component is from 30:70 to 60:40. Outside this range, the fiber obtained is unsatisfactory in the points of nonflamability or tensile character.

Next, we will explain about the addition of organic phosphorous compounds, which in some cases of the invention are incorporated.

A variety of organic and inorganic phosphorous compounds are generally used as flame-retardant chemicals for textiles, mainly in the stage of finishing treatment at which the phosphorous compounds are deposited on the surface of the textile and heatfixed. In the case of these after-treatments, the durability of the effect is always low or marginal. In our invention this finishing treatment is also possible and more effective than in the general finishing treatment when the phosphorous compound is capable of reacting with the amino resin, that is, structural component of the fiber.

The second and most effective method of incorporation of phosphorous compounds into the fiber, however, is the addition in the stage of the spinning dope, especially in the stage of the preparation of the amino resin. In this case the phosphorous compound should be chemically reacted with other polymers so that it will not be lost in the spinning process. For this purpose, the most preferable are organic phosphorous compounds having methylol groups (—CH$_2$OH), which are easily incorporated into the reaction of the amino resin formation. Tetrakis (hydroxymethyl) phosphonium salts, such as, chloride (THPC) or sulfate (THPS), and N-methylol propionamide are typical examples of preferable compounds having methylol groups in the molecule. Almost the same reaction as with the N-methylol groups of the amino resin is expected for the methylol groups of the phosphorous compounds and, therefore, they are easily incorporated into the amino resin. The same durability of the effect after launderings as with the amino resin can be expected. These phosphorous compounds having methylol groups can be added at any step of the reaction of the amino resin formation, at the step of methylation under a basic condition, at the step of methylation under an acidic condition or after the formation of the amino resin.

In some cases the phosphorous compounds can be chemically linked with polymers other than an amino resin. Phosphorous compounds having a vinyl group can be copolymerized with other vinyl monomers such as acrylamide, N-methylol acrylamide and vinyl acetate. The copolymers thus obtained, having phosphorus, may be grafted to polyvinyl-alcohol or may be incorporated into the dope as it is. A typical example of the compound having a vinyl group is a vinyl-phosphonate

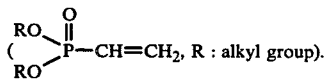

(R : alkyl group).

The effect of these various phosphorous compounds on the flame-retardance in our invention is surprising and definite. Generally, until now, in order to expect reasonable flame-retardance for cellulose fabrics or synthetic fibers, such as polyesters and acrylics, a remarkable amount of phosphorus was needed. The content of phosphorus of about 4 to 10 weight % was the lower limit to reduce the flamability of the textiles. In our invention, the flame-retardant character of the amino resin is multiplied by the remarkable flame-retardant ability of the phosphorous compound, so the effect is surprising and definite. A very small amount of phosphorous compound is enough to expect a high flame-retardance; the amount of the phosphorous compound which gives about 0.1 to 1.0 weight % phosphorus content in the fiber is enough to obtain necessary flame retardance.

For end-uses where a very high tensile character is needed, the content of polyvinyl alcohol component in the fiber should be increased and the phosphorus content should be also increased if flame-resistance is needed at the same time. A greater content than 4.0 weight % of phosphorus causes flame-retardance saturation, and degradation in the processability of the dope and the touch of the final product.

Next, the preparative method and characters of the spinning dope, and the spinning process will be explained.

When phosphorous compounds are incorporated into the spinning dope, they are mostly added and reacted with the amino resin or polyvinyl-alcohol component. There are various ways of blending of the amino resin with the polyvinyl alcohol components. The polyvinyl alcohol component may be dissolved in the solution of the amino resin, the polyvinyl alcohol solution may be blended with the amino resin solution or the amino resin may be prepared in the solution of the polyvinyl alcohol.

The preferable content of the total solid polymer consisting mainly of the amino resin and the polyvinyl alcohol components varies with the type of the amino resin and polyvinyl alcohol components, with the weight ratio thereof and with the solvent used. The polymer content of about 10 to 30 weight % is preferably applied so that the solution viscosity of the dope remains in the range of from 1 to 1000 poises at 30° C., preferably in the range of 5 to 500 poises.

For the spinning of the dope, the conventional types of spinning apparatus can be employed. In wet spinning the dope is extruded through spinnerts into a coagulant to make filaments. Possible examples of coagulants are an aqueous mixture of dimethylsulfoxide, alcohols such as methanol and butanol, ketones such as acetone and cyclohexanone, an aqueous solution of inorganic salts such as sodium sulfate and potassium carbonate, an aqueous alkaline solution of sodium hydroxide or potasium hydroxide and an aqueous solution of the above inorganic salts and alkalies. Dry-spinning, where the dope is extruded downward through spinnerts into a drying environment and the solvent is gradually evaporated from the surfaces of the resultant filaments forwarding downwardly, can also be utilized. The preferable temperature at which the spinning operation is carried out, ranges from about 0 to 100° C. in the case of wet-spinning and from about 80° to 250° C. in the case of dry-spinning.

Filaments coagulated or solvent evaporated are generally dipped in a water-bath to wash out the solvent or salts, dried, drawn and heat-treated to obtain fibers of excellent characteristics. The appropriate temperature of drawing and heat-treatment ranges about from a room temperature to 300° C. The drawing may be carried out either under a wet or dry condition.

The fibers obtained as described above (hereafter called drawn fibers or uncured fibers) have already at this stage excellent tensile characters. The amino resin has undergone some chemical reactions to change it to a crosslinked insoluble and infusible structure of high methylene content during coagulation, drawing and heat-treatment. But most of the polyvinyl alcohol component remains uncured or uncrosslinked, so that the fiber has not yet enough stability against hot-wet conditions. This extremely narrows the end uses of the fibers. Therefore, in order to give more sufficient properties to the fibers, the above drawn fibers undergo curing treatment under an acidic formaldehyde condition, by which the amino resin becomes a more crosslinked structure of higher methylene content and the polyvinyl alcohol component is partially cured by acetal linkage. Some intramolecular methylene bridges between the amino resin and the polyvinyl alcohol component also occur in this curing treatment to promote the crosslinking of the structure of the fiber.

This curing treatment is carried out by keeping the drawn fibers in an acid formaldehyde environment, in solution or in a gas phase. Formaldehyde producing compounds such as aqueous formaldehyde solution, paraformaldehyde, trioxane and tetraoxymethylene may be used. Other aldehydes such as acetaldehyde, furfral and benzaldehyde can also be used either mixed with formaldehyde or not. The acid catalysts for the curing reaction are preferably selected from mineral acid such as hydrochloric, sulfuric acid and phosphoric acid; organic acids such as oxalic acid and acetic acid; sulfonic acids such as p-toluene sulfonic acid, and; Lewis acids such as aluminum chloride and zinc chloride.

The curing treatment is carried out most conveniently in aqueous or organic solution of formaldehyde and an acid. The concentration of formaldehyde in the solution may be widely varied with the amount of the fibers to be treated and the amount of the solution. A small amount of acid is enough to catalize the curing reaction, but in some cases a remarkably large amount of acid is preferably used to control the reaction. Inorganic salts such as sodium sulfate or ammonium sulfate are also preferably added to the curing agent to control the swelling of the fiber. The curing temperature ranges from a room temperature to 200° C., preferably to 100° C., in solution. The cured fibers are next washed with a large amount of water to remove the non-reacted formaldehyde, and dried.

In addition to the above described complicated and troublesome curing treatments after drawing and heat-treatment, we have invented a novel and more simplified curing method, in which the components of the fiber undergo chemical curing reaction at the stage of the continuous yarn-making process. By this invented method, the drawn and heat-treated fibers, as it is, have sufficiently stable properties under hot-wet conditions. This novel curing process involves dipping the continuous filaments in an aqueous or organic solvent soluton of proper crosslinking reaction accelerators before drying. When the filaments undergo drawing and heat-treatment later, curing chemical reactions take place inside the structure of the fiber and fibers of high resistance against boiling water treatment, which for example corresponds to a dyeing process, are obtained.

Two kinds of crosslinking reaction accelerators can be used in this technique; one is a curing reagent and the other is a curing catalyst. The joint use of both of the curing reagent and curing catalyst is most preferable, but the use of one of the two is also effective for curing the fiber.

Examples of the proper curing reagents usable for this process are mono-, di-, tri-, tetra-, penta and hexa-methylol melamine and their derivatives, mono- and di-methylol urea and their derivatives, tetrakis (hydroxymethyl) phosphonium chloride (THPC) and tetrakis (hydroxymethyl) phosphonium sulfate (THPS), and mixtures or reaction products of two or more of these reagents. Examples of the proper curing catalysts usable for this process are ammonium chloride, ammonium phosphate, ammonium salt of toluene sulfonic acid, zinc sulfate, zinc chloride, magnesium chloride, sulfamic acid, p-toluene sulfonic acid and ethanolamine hydrochloride.

As mentioned above these curing reagents and curing catalysts are most conveniently taken up by the filaments from an aqueous or organic solvent solution during the contact of one to several hundred seconds. In this process, in order to complete the curing reaction inside the fiber structure a somewhat higher temperature is preferably applied during the drawing and heat-treatment steps than in the conventional yarn making process.

The fibers obtained by our invention have a very wide variety of end-uses because of their excellent characteristics. That is, they are highly flame-retardant and have excellent dyeability for disperse and acid dyes, and excellent colour-fastness against light and laundering; they have a great resistance to chemicals such as acids and alkalies, and; they have a moderate hygroscopic character of 8 to 10% at 65% relative humidity similar to natural fibers such as wool or cotton. Because of these characteristics the fibers of this invention can be used as a sole material for textiles or as a blending material with other textile materials such as silk, wool, cotton, polyamide, polyester and polyacrylic fibers.

In the following examples further illustrating, but not limiting, the invention, the parts mentioned are parts by weight.

Examples 1-A and 1-B

Preparation of reaction products of urea and THPC (The preparation of $P_1$ solution)

In a 10l separable flask, the following mixture was stirred at 80° C. for 2 hours.

| | |
|---|---|
| 80% aqueous THPC solution | 1734.4 parts |
| Urea | 771.2 parts |
| Water | 6720 parts |

Each gram of the solution obtained ($P_1$ solution) contained 0.0836 g of urea and 0.02448 g of phosphorus (P).

PREPARATION OF THE AMINO RESIN SOLUTION

In a 1l separable flask, 63.6 parts of melamine, 12.2 parts of urea, 5.5 parts of dicyandiamide, 62.3 parts of 37% formaldehyde aqueous solution and 3.5 parts of 1N-sodium hydroxide aqueous solution were mixed and reacted in 370.5 parts of water at 80° C. for one hour. Then 44.7 parts of the P1 solution and 55.7 parts of 35% hydrochloric acid aqueous solution were added, in that order, and the reaction was kept at 80° C. for 70 minutes. An A1 solution was obtained where the methylene content of the amino condensate was 82%.

THE PREPARATION OF SPINNING DOPE 97.3 parts of polyvinyl alcohol (the degree of polymerization: 1800, the degree of saponification: over 98.5 to 99.4%) was dissolved in 366 parts of water at 90° to 95° C. This polyvinyl alcohol solution was cooled to 70° C. and, then, 618 parts of the $P_1$ solution (80° C.) was added and mixed while vigorously stirring the mixture for one hour, the temperature being gradually reduced to 30° C. Then, the dope was further stirred slowly for 16 hours at 30° C. The characteristic properties of the dope obtained above are as follows.

| | |
|---|---|
| Total polymer content: | 18.0% |
| Mole ratio of the aminocompounds (melamine/urea/dicyandiamide): | 74.8/18.7/6.5 |
| Weight ratio of the amino resin to polyvinyl-alcohol: | 50/50 |
| Phophorus content (P atom based): | 0.6% |
| Viscosity at 30° C: | 22.5 poises |

SPINNING AND FIBER CHARACTERISTICS

The dope obtained above was filtered and defoamed before spinning under the conditions outlined in table 1, below.

Table 1

| | |
|---|---|
| Spinnert | diameter 0.08 mm, 200 holes |
| Extrusion rate | 3.5g of dope/minute |
| Coagulating system | three baths of the same composition $Na_2SO_4$/NaOH/Water (in weight) |

Table 1-continued

| | |
|---|---|
| | 25/2/100 |
| | 1st bath 30° C. |
| | 2nd bath 30° C. |
| | 3rd bath 50° C. |
| Drawing temperature | 210 to 230° C (set temperature of a heat plate) |
| Total draw ratio | 8.8 |
| Heat-set temperature | 235° C.(surface temperature of a heat roler) |

The fibers obtained by the above process (drawn fibers) were next dipped in an aqueous solution of 10% sulfuric acid, 3.7% formaldehyde aqueous solution and 20% sodium sulfate for 30 minutes at 50° C., and then, washed with cold water and boiling water repeatedly, followed by drying to obtain cured fibers. The characteristics of the drawn (uncured) fibers and cured fibers (1-A) are listed in table 2, below.

With the exclusion of the dicyandiamide, a spinning dope of the same composition as in the above described example was prepared. The spinning dope was wet-spun, and cured in the same manner as in the above described example. The characteristics of the fibers (1-B) obtained are listed in Table 2, below.

Table 2

| Sample | Denier (d) | Tenacity (g/d) | Breaking elongation (%) | Initial Young's Modulus (g/d) | Class of flamability (*1) | Class of Colourfastness (*2) |
|---|---|---|---|---|---|---|
| Ex. 1-A Drawn fibers | 2.6 | 5.2 | 10.9 | 129 | — | — |
| Cured fibers | 3.2 | 3.3 | 23.0 | 67 | 5 | 3 |
| Ex. 1-B Drawn fibers | 2.9 | 5.1 | 12.0 | 143 | — | — |
| Cured fibers | 3.6 | 2.9 | 26.0 | 61 | 5 | 1 |

*1 Class of Flamability
About 50 mg of the crumbled fiber staple was put into an upper part of a lighter flame about 2 cm long for about 2 seconds, and the state of burning of the sample was observed and graded into the following 5 classes.
    Class 1: The sample flares up at once when it is put into the lighter flame, and the flame does not extinguish even after the lighter is removed. General cellulose fiber belongs to the class 1.
    Class 2: The sample keeps burning while it is in the flame of the lighter, but it extinguishes within 5 to 10 seconds after the lighter flame is removed.
    Class 3: The sample extinguishes within 5 seconds.
    Class 4: The sample extinguishes within 2 seconds.
    Class 5: The sample does not seem to flare up even in the flame of the lighter, and no flare can be seen when it is removed from the flame of the lighter.
*2 Class of color fastness of dyed samples
Shape and form of the sample:
  knitted fabric, 3 cm × 3 cm (about 1 g)
Dyestuff:
  Kayanol Mill Red RS (Milling type acid dye made by Nihon Kayaku, Japan)
Dyeing conditions:
  10 mg of the dyestuff and 30 mg of ammonium sulfate were dissolved in about 30 ml of water and the sample was dipped in this solution. Then, the solution with the sample in it, was gradually heated to boiling and kept there for 30 minutes. The dyed sample was lightly washed with cold water and dried at 80° C.
Evaluation of colour fastness:
  Based on JIS-L-0844, A-2. The sample was dipped in the solution (100 ml) of 0.5% laundry soap at 50° C. and shaken for 30 minutes. The colouring of the laundry solution was observed with naked eyes and classified into 5 classes (compared with 5 standards).
    Classes 1 and 2: The colour of the laundry solution is dark and easily visible.
    Class 3: A slight shade of the colour of the laundry Table 2-continued

| Sample | Denier (d) | Tenacity (g/d) | Breaking elongation (%) | Initial Young's Modulus (g/d) | Class of flamability (*1) | Class of Colourfastness (*2) |
|---|---|---|---|---|---|---| solution is descerned.
    Classes 4 and 5: Little or no colouring is distinguished.

EXAMPLE 2

An amino resin solution $A_2$ was prepared from 95.4 parts of melamine, 18.3 parts of urea, 16.5 parts of dicyandiamide, 93.5 parts of 37% formaldehyde aqueous solution, 5.3 parts of 1N-sodium hydroxide aqueous solution, 556 parts of water, 67.1 parts of the $P_1$ solution (see example 1) and 83.7 parts of 35% hydrochloric acid aqueous solution in the same manner as described in example 1-A.

In another flask, 154.2 parts of polyvinyl alcohol (the same as used in example 1) were dissolved in 578 parts of water at 90 to 95° C. and the solution was cooled to 70° C. The $A_2$ amino resin solution above, kept at 80° C., was mixed with this polyvinyl alcohol solution in the same manner as described in example 1-A and a spinning dope with the following characteristic properties was obtained.

| | |
|---|---|
| Mole ratio of the amino compounds (melamine/urea/dicyandiamide): | 56/29.5/14.5 |
| Weight ratio of the amino resin and polyvinyl alcohol: | 50/50 |
| Viscosity at 30° C: | 18 poises |

The dope was wet-spun and cured in the same manner as described Example 1-A. The following Table 3 lists the characteristic properties of the fiber.

Table 3

| Samples | Denier (d) | Tenacity (g/d) | Breaking elongation (%) | Initial Young's modulus (g/d) | Colour fastness (class) | Flamability (class) |
|---|---|---|---|---|---|---|
| Drawn fiber (uncured) | 2.6 | 5.4 | 11.4 | 125 | — | — |
| Cured fiber | 3.1 | 3.2 | 23 | 51 | 3 – 4 | 5 |

EXAMPLE 3

A spinning dope was prepared in the same manner as described in example 1-A by mixing 95.4 parts of melamine, 18.3 parts of urea, 11.6 parts of dicyandiamide, 84.7 parts of 37% formaldehyde aqueous solution, 6 parts of 1N-sodium hydroxide aqueous solution and 527 parts of water at 80° C. for 70 minutes and, then, adding and mixing, 67.1 parts of the $P_1$ solution (see example 1), 83 parts of 35% hydrochloric acid aqueous solution, 139 g of polyvinyl alcohol (the same as used in example 1) and 518 parts of water at 80° C. for 70 minutes. The dope obtained above had the following characteristics.

| | |
|---|---|
| Total polymer content: | 18.0% |
| Mole ratio of the amino compounds (melamine/urea/dicyandiamide): | 58.5/30.8/10.7 |
| Weight ratio of the amino resin and polyvinyl-alcohol: | 50/50 |

The characteristics properties of the fiber obtained are listed in table 4, below.

EXAMPLE 4

The same procedures as described in Example 3 were carried out except that during the spinning process, the stream of multifilaments was dipped for about one minute in an aqueous solution of 5 weight % of trimethoxy methylol melamine ("M-3" made by Sumitomo Chemicals, Japan) before the drawing and heat-treatment. In this case the drawn (uncured) fiber had the same resistance to boiling water as the cured fibers of example 3, as shown in table 4, below.

Table 4

| Samples | Tenacity (g/d) | Break-elongation (%) | Initial Young's modulus (g/d) | Flamability (class) | Colour fastness (class) | Behavior in boiling water |
|---|---|---|---|---|---|---|
| Example 3 | | | | | | |
| Drawn fibers (uncured) | 4.9 | 11 | 125 | 5 | —* | shrinks to a small ball |
| Cured fibers | 3.0 | 37 | 51 | 5 | 4 | stable |
| Example 4 | | | | | | |
| Drawn fibers | 5.5 | 12 | 115 | 5 | 3 | stable |
| Cured fibers | 3.0 | 30 | 51 | 5 | 4 | stable |

*A dyed sample could not be obtained because of the lack of stablity against boiling water (dyeing condition) as shown in the last column.

EXAMPLES 5 and 6

In a 1l separable flask a mixture of 57.6 parts of melamine, 14.4 parts of urea, 53.4 parts of 37% formaldehyde aqueous solution, 3.3 parts of 1N-sodium hydroxide aqueous solution and 442 parts of water, was reacted at 80° C. for one hour. Then, 112.3 parts of 80% THPC aqueous solution (density 1.337) and 45.1 parts of 35% hydrochloric acid were added to the mixture, in that order, and the resulting mixture was kept at 80° C. for 70 minutes under mild stirring. At this point the methylene content of the amino resin was 82%.

The above amino resin solution was mixed with 250 parts of polyvinyl alcohol (the degree of polymerization 2000, the degree of saponification 98.5% to 99.4%) solution (concentration 20%) at 30° C. and the resulting mixture was kept about 16 hours under mild stirring. The dope obtained had the following characteristic properties.

| Total polymer content: | 15.5% |
|---|---|
| Viscosity at 30° C: | 12.4 poises |
| Weight ratio of the amino resin and polyvinyl alcohol: | 58/42 |
| Mole ratio of the amino compound (melamine/urea): | 80/20 |
| Phosphorus content (weight): | 1.0% |

One half of the dope was wet-spun under conditions shown in Table 5, below.

Table 5

| Spinnert | diameter 0.08 mm, 200 holes |
|---|---|
| Extrusion rate | 5 g of dope/minute |
| Coagulation system | the same as example 1 |
| Drawing temperature | 230° C.(set temperature of a heat plate) |

Table 5-continued

| Total draw ratio | 8 |
|---|---|
| Heat set condition | 290° C. (set temperature of a heat roler) free shrinkage of about 8% |

The fiber obtained (Example 5) had the characteristics shown in table 6, below.

Another half of the dope was wet-spun in the same manner as described in Example 5 above, except that during the spinning process the filaments were dipped in a 2% $NH_4Cl$ aqueous solution for about one minute. The fiber characteristics (Example 6) are shown in Table 6, below.

Table 6

| Samples | Tenacity (g/d) | Breaking elongation (%) | Initial Young's modulus (g/d) | Flamability (class) | Shrinkage in boiling water (%) |
|---|---|---|---|---|---|
| Example 5 | | | | | |
| Before boiling | 3.5 | 14 | 83 | 4 | 30.3 |
| After boiling | 2.3 | 42 | 35 | 4 | −0.2 |
| Example 6 | | | | | |
| Before boiling | 3.4 | 12 | 88 | 5 | 17.4 |
| After boiling | 2.5 | 35 | 45 | 5 | 1.1 |

The effect of ammonium chloride on the resistance characteristics of the fiber to boiling water is obvious from table 6.

EXAMPLES 7A through 7D

Using the same process as described in Example 5, above, a spinning dope of the following characteristics was obtained.

| Total polymer content: | 17.0% |
|---|---|
| Viscosity at 30° C: | 50 poises |
| Weight ratio of the amino resin and polyvinyl alcohol, (the same as example 5): | 40/60 |
| Mole ratio of melamine and urea: | 80/20 |
| Phosphorus content (weight): | 1.0% |

The dope was wet-spun in the same manner as described in Example 6, except that $NH_4Cl$ was replaced by different curing promotive agents as shown in table 7, below. The fiber characteristics after boiling in water for 20 minutes are shown in table 7, below.

Table 7

| Examples | Cureing promotive agents | Denier (d) | Tenacity (g/d) | Initial Young's modulus (g/d) | Flamability grade | Shrinkage in boiling water (%) |
|---|---|---|---|---|---|---|
| Example | | | | | | |

Table 7-continued

| Examples | Cureing promotive agents | Denier (d) | Tenacity (g/d) | Initial Young's modulus (g/d) | Flamability grade | Shrinkage in boiling water (%) |
|---|---|---|---|---|---|---|
| 7-A | Magnesium chloride | 3.0 | 3.5 | 58 | 4 | 19 |
| 7-B | Ammonium phosphate | 3.1 | 3.4 | 57 | 4 | 21 |
| 7-C | Ethanol amine hydrochloride | 3.3 | 3.4 | 55 | 4 | 23 |
| 7-D | Zinc chloride | 3.0 | 3.5 | 57 | 4 | 18 |

EXAMPLE 8

Using the same process as described in Example 1, the various spinning dopes shown in table 8, below, were prepared, wet-spun and cured. The flamability grades of the fibers obtained are also shown in table 8, below.

Table 8

| Samples | M/U* (weight) | Phosphorus content (%) | Weight ratio of the amino resin and polyvinyl-alcohol** | Flamability grade Cured fibers | Flamability grade Cured and boiled in water for 2 hours | Spinnability |
|---|---|---|---|---|---|---|
| Example | | | | | | |
| 8-A | 65/35 | 0 | 40/60 | 4 | 2 | good |
| 8-B | 65/35 | 0.1 | 40/60 | 4 | 3 | good |
| 8-C | 65/35 | 1.0 | 40/60 | 5 | 4 | good |
| 8-D | 65/35 | 2.0 | 40/60 | 5 | 5 | fine |
| 8-E | 65/35 | 4.0 | 40/60 | 5 | 5 | poor |
| 8-F | 65/35 | 5.0 | 40/60 | — | — | impossible |
| 8-G | 40/60 | 1.0 | 60/40 | 5 | 4 | good |

*M/U represents the mole ratio of melamine and urea
**polyvinyl-alcohol
degree of polymerizaton 2000
degree of saponification 98.5 - 99.4%

EXAMPLE 9

In a 2l separable flask, 45 parts of melamine, 55 parts of benzoguanamine, 16.6 parts of 80% THPC aqueous solution and 600 parts of dimethylsulfoxide were kept at 80° C. for 1 hour under mild stirring. Then, to this solution, 52.8 parts of 37% formaldehyde and 35 parts of 35% hydrochloric acid were added and the resulting mixture was kept at 70° C. for 70 minutes. At this point the methylene content of the amino resin was 95.6%.

A solution consisting of 110 parts of polyvinyl alcohol (degree of polymerization =2000, degree of saponification = 98.5 to 99.4%) and 440 parts of dimethylsulfoxide was mixed and blended while vigorously stirring at 30° C. The dope obtained had the following properties.

| Polymer content: | 16.5% |
|---|---|
| Viscosity at 30° C: | 98 poises |
| Weight ratio of the amino resin and polyvinyl alcohol: | 49/51 |
| Phosphorus content (weight): | 1.0% |

Fibers were obtained from the dope obtained using the same process as described in Example 1. The fiber characteristics are shown in table 9, below.

Table 9

| Example 9 Samples | Denier (d) | Tenacity (g/d) | Elongation (%) | Initial young's modulus (g/d) | Phosphorus content (%) | Flamability grade |
|---|---|---|---|---|---|---|
| Drawn fiber | 3.0 | 4.6 | 17 | 96 | 0.9 | 5 |
| Cured fiber | 3.5 | 3.8 | 21 | 66 | 0.8 | 5 |
| Cured and boiled in water 2 hours | 3.4 | 3.9 | 20 | 61 | 0.8 | 5 |

EXAMPLES 10 and 11

A spinning dope of the following properties was prepared using the same process as described in Example 1.

| Total polymer content: | 18% |
|---|---|
| Viscosity: | 34 poises |
| Weight ratio of the amino resin and polyvinyl alcohol (the degree of polymerization 1800, the degree of saponificaton 98.5 - 99.4%): | 50/50 |
| Mode ratio of the amino-compounds (Melamine/urea/dicyandiamide): | 66.6/21.4/12.0 |
| Phosphorus content: | 0% |

One half of the dope was wet-spun in the same manner as described in Example 1 and cured (Example 10). The other half of the dope was wet-spun in the same manner, except that the wet filaments were dipped during the spinning process in an aqueous solution consisting of 3% tetrakis(hydroxymethyl)phosphonium sulfate (THPS), 3.2% trimethoxymethyrolmelamine and 1.4% 1N-sodium hydroxide aqueous, for 2 seconds before drawing (Example 11).

The fiber characteristics of Examples 10 and 11 are listed in table 10, below.

Table 10

| Samples | Tenacity (g/d) | Breaking elongation (%) | Initial young's modulus (g/d) | Phosphorus content (%) | flamability (class) |
| --- | --- | --- | --- | --- | --- |
| Example 10 | 2.9 | 30 | 52 | 0 | 3 |
| Example 11 | 2.9 | 27 | 59 | 0.54 | 5 |

EXAMPLE 12

A spinning dope was prepared in the same manner as described in Example 1, except that the 97.3 parts of polyvinyl alcohol was replaced by a mixture of 3.9 parts of polyvinyl alcohol (degree of polymerization 2000, degree of saponification 78.5–81.5%) and 93.4 parts of polyvinyl alcohol (degree of polymerization 1800, degree of saponification 98.5 to 99.4%; the same as Example 1). The other preparative conditions were the same as described in Example 1. The dope obtained has a better filterability than the dope of Example 1 through a 400 mesh stainless-steel filter, which showed a better micro-uniformity of the dope.

The fiber obtained from this dope had much the same characteristics as that of Example 1, except that the tenacity was a little lower.

COMPARATIVE EXAMPLE 1

An amino resin solution was prepared from 22.6 parts of melamine, 3.5 parts of urea, 2.7 parts dicyandiamide, 21.8 parts of 37% formaldehyde, 1.4 parts 1N-sodium hydroxide aqueous solution, 117.2 parts of water and 20.9 parts of 35% hydrochloric acid in the same manner as described in Example 1.

In another flask 128.0 parts of polyvinyl alcohol (the same as in Example 1) was dissolved in 681.9 parts of water at 90 to 95° C. and the solution was cooled to 70° C. The amino resin solution described above was kept at 80° C. and was mixed with this polyvinyl alcohol solution in the same manner as described in Example 1. A spinning dope of the following characteristic properties was obtained.

| | |
| --- | --- |
| Mole ratio of the amino compounds (melamine/urea/dicyandiamide): | 66.5/21.6/11.9 |
| Weight ratio of the amino resin and polyvinyl alcohol: | 20/80 |
| Viscosity at 30° C: | 40 poises |

The dope was wet-spun and cured using in the same method as described in Example 1. The following table 11 lists the characteristics properties of the fiber.

Table 11

| Sample | Denier (d) | Tenacity (g/d) | Breaking elongation (%) | Initial young's modulus (g/d) | Colourfastness (class) | Flamability (class) |
| --- | --- | --- | --- | --- | --- | --- |
| Drawn fiber (uncured) | 2.1 | 6.3 | 7.5 | 184.9 | — | — |
| Cured fiber | 2.5 | 4.2 | 16.3 | 81.0 | 223 | 1 |

The flame retardant characteristic of this comparative example was unsatisfactory, as shown in table 11.

What we claim is:

1. A flame retardant fiber comprising (A) about 30 to 60 parts by weight of an amino resin, said amino resin consisting of a condensate of formaldehyde with an amino compound mixture consisting of melamine, urea and dicyandiamide in proportions satisfying the following relations (1) and (2):

$$0.02 \leq \frac{D}{M + U + D} \leq 0.5 \quad (1)$$

and $$0.3 \leq \frac{M}{M + U} \leq 0.85 \quad (2)$$

wherein M is the number of moles of melamine, U is the number of moles of urea, and D is the number of moles of dicyandiamide, said amino resin containing at least 50% by mole of methylene linkages based on the amount of formaldehyde used; and (B) about 70 to 40 parts by weight of polyvinyl alcohol.

2. A flame retardant fiber according to claim 1, wherein about 0.1 to 4.0% of phosphorus based on the weight of said fiber is contained in said fiber.

3. A flame retardant fiber according to claim 2, wherein the content of phosphorus in the fiber is in a range from 0.1 to 1.0% based on the weight of the fiber.

* * * * *